United States Patent
Kaku et al.

[11] Patent Number: 5,528,624
[45] Date of Patent: Jun. 18, 1996

[54] DS/CDMA RECEIVER USING PARALLEL-OPERATING MULTI-PURPOSE CORRELATORS

[75] Inventors: Tomoya Kaku; Sean O'Regan, both of Tokyo, Japan

[73] Assignee: NEC Corporation, Japan

[21] Appl. No.: 365,891

[22] Filed: Dec. 29, 1994

[30] Foreign Application Priority Data

Dec. 30, 1993 [JP] Japan .................................. 5-354555

[51] Int. Cl.[6] .............................. H04K 1/00; H04L 27/30
[52] U.S. Cl. ............................. 375/206; 375/205
[58] Field of Search ..................................... 375/205, 206, 375/207, 208, 343, 354, 364, 367; 370/18, 19, 20, 110.1, 110.3, 110.4; 327/164; 364/717

[56] References Cited

U.S. PATENT DOCUMENTS 5,103,459  4/1992  Gilhousen et al. ..................... 375/205
5,414,728  5/1995  Zehavi ..................................... 375/205

*Primary Examiner*—Stephen Chin
*Assistant Examiner*—Tesfaldet Bocure
*Attorney, Agent, or Firm*—Ostrolenk, Faber, Gerb & Soffen

[57] ABSTRACT

In a direct sequence spread spectrum receiver, multiple correlators are provided for despreading a spread data signal and a spread pilot signal. During a sync acquisition mode, pilot demodulators are connected to the correlators, respectively, and during a subsequent tracking mode, data demodulators are connected to the correlators whose outputs are combined by an adder to produce an output for the receiver. Despreading codes of different phase positions are generated and supplied to the correlators, respectively. During the sync acquisition mode, the phase position of each despreading code is successively shifted and high correlation values are determined from the outputs of the pilot demodulators. During the tracking mode, the phase positions of the despreading codes are set according to the high correlation values.

9 Claims, 8 Drawing Sheets

DS/CDMA RECEIVER USING PARALLEL-OPERATING MULTI-PURPOSE CORRELATORS

BACKGROUND OF THE INVENTION

1. Field of the Invention

The present invention relates generally to direct sequence spread spectrum (code division multiple access) receivers. This invention is particularly concerned with a sync acquisition and tracking technique for direct sequence spread spectrum receivers of cellular mobile communications systems in which transmitted signals are severely affected by Rayleigh fading and multipath fading.

2. Description of the Related Art

Commercial interest in direct sequence spread spectrum (code division multiple access) communication systems has recently risen due to their potential ability to provide service to more users than is offered by other multiple access techniques. In the cell-site station of the DS/CDMA system, a data symbol is spread by multiplying it with orthogonal pseudo-random number (PN) sequences assigned to the cell site as well as with orthogonal Walsh codes assigned to the channel over which the spread signal is transmitted. In order to enable the mobile station to provide sync acquisition and tracking operation, a pilot signal is superimposed on the data symbol sequence. At the mobile station, a sliding correlation technique is used to shift the phase timing of a local PN sequence by a predetermined amount each time a correlation is taken between the received and local sequences and determine the correct phase timing for the local sequence when the correlation exceeds some critical value. Such phase shifting is performed at predetermined "window" intervals. Once synchronization is established, the phase difference is monitored and maintained to within one half of the chip interval. During transmission, the signal undergoes reflections from various land structures, producing a complex pattern of standing waves due to mutual interference. As a result, the propagation path of the signal exhibits a field intensity distribution which is approximated by the Rayleigh distribution. Thus, the signal experiences a phenomenon called "Rayleigh fading" and the envelope of the signal at the mobile station as well as its phase violently fluctuate.

Under such unfavorable conditions, the sliding correlation technique is not ideal to achieve quick synchronization in response to the rapidly varying signal levels. In addition, there is often a need to update the mobile's phase timing due to the arrival of a strong reflection or a signal of significant level from an adjacent cell site. Under such circumstances, the prior art system sets the correlation circuitry to the new phase timing immediately in response to the arrival of a new strong signal without taking the old symbols, which may be left in the correlation circuitry, into account. The use of the old symbols for the new phase timing results in timing discontinuity and produces over-correlation or under-correlation.

SUMMARY OF THE INVENTION

The primary object of the present invention is therefore to provide a direct sequence spread spectrum receiver capable of establishing quick synchronization under varying signal levels.

Another object of the present invention is to provide a direct sequence spread spectrum receiver which ensures seamless transition when updating the phase timing of correlation process.

According to the present invention, there is provided a direct sequence spread spectrum receiver which comprises a plurality of correlators for despreading a spread data signal and a spread pilot signal, a plurality of pilot demodulators, a plurality of data demodulators and an adder. The data demodulators and the adder constitute a RAKE receiver. During a sync acquisition mode, the pilot demodulators are connected to the correlators, respectively, and during a subsequent tracking mode, the data demodulators are connected to the correlators to produce a plurality of demodulated data signals which are combined by the adder to produce an output for the RAKE receiver. A plurality of despreading codes of different phase positions are generated and supplied to the correlators, respectively, causing the correlators to despread one of the spread data and pilot signals. During the sync acquisition mode, the phase position of each despreading code is successively shifted and high correlation values are determined from the outputs of the pilot demodulators. During the tracking mode, the phase positions of the despreading codes are set according to the high correlation values. Since multiple correlators operate in parallel during the sync acquisition mode, the time taken to search through the range of possible phase positions is significantly reduced. In practical aspect, the data demodulators are provided in number corresponding to the number of multipath fading channels.

The despreading codes are generated such that, during the sync acquisition mode, all the correlators provide correlations for the incoming pilot signal only, and during the tracking mode, one half of the correlators provide correlation for the data signal and the remainder provides correlation for the pilot signal.

The despreading code comprises a pseudo-random number (noise) sequence uniquely identifying a cell site area and a Walsh code identifying a communication channel. When the Walsh code is set to an all-zero code, the correlators supplied with this code is set to provide correlation with the pilot signal.

In a preferred aspect, a second despreading code of different phase position is supplied to a specified one of the correlators during the tracking mode to continue searching for best phase positions. The phase position of the second despreading code is shifted in the neighborhood of those previously set in the sync acquisition mode and high correlation values are newly determined from output signals from one of the pilot demodulators. The previously set phase positions are updated according to the new high correlation values during an update mode.

To ensure smooth transition when new phase positions are determined and old phase positions are to be updated, a second data demodulator is provided. This data demodulator is connected to the output of the specified correlator at the time the specified correlator is set to a new phase position. In response to the connection of the second data demodulator to the specified correlator, a ramp-up time is introduced to allow old symbols to be replaced with new symbols, and immediately following the ramp-up time, a successive one of the outputs of the other data demodulators is disconnected from the adder for a predetermined interval and, instead, the output of the second data demodulator is connected to the adder during that predetermined interval.

BRIEF DESCRIPTION OF THE DRAWINGS

The present invention will be described in further detail with reference to the accompanying drawings, in which.

DETAILED DESCRIPTION

Figure 1:
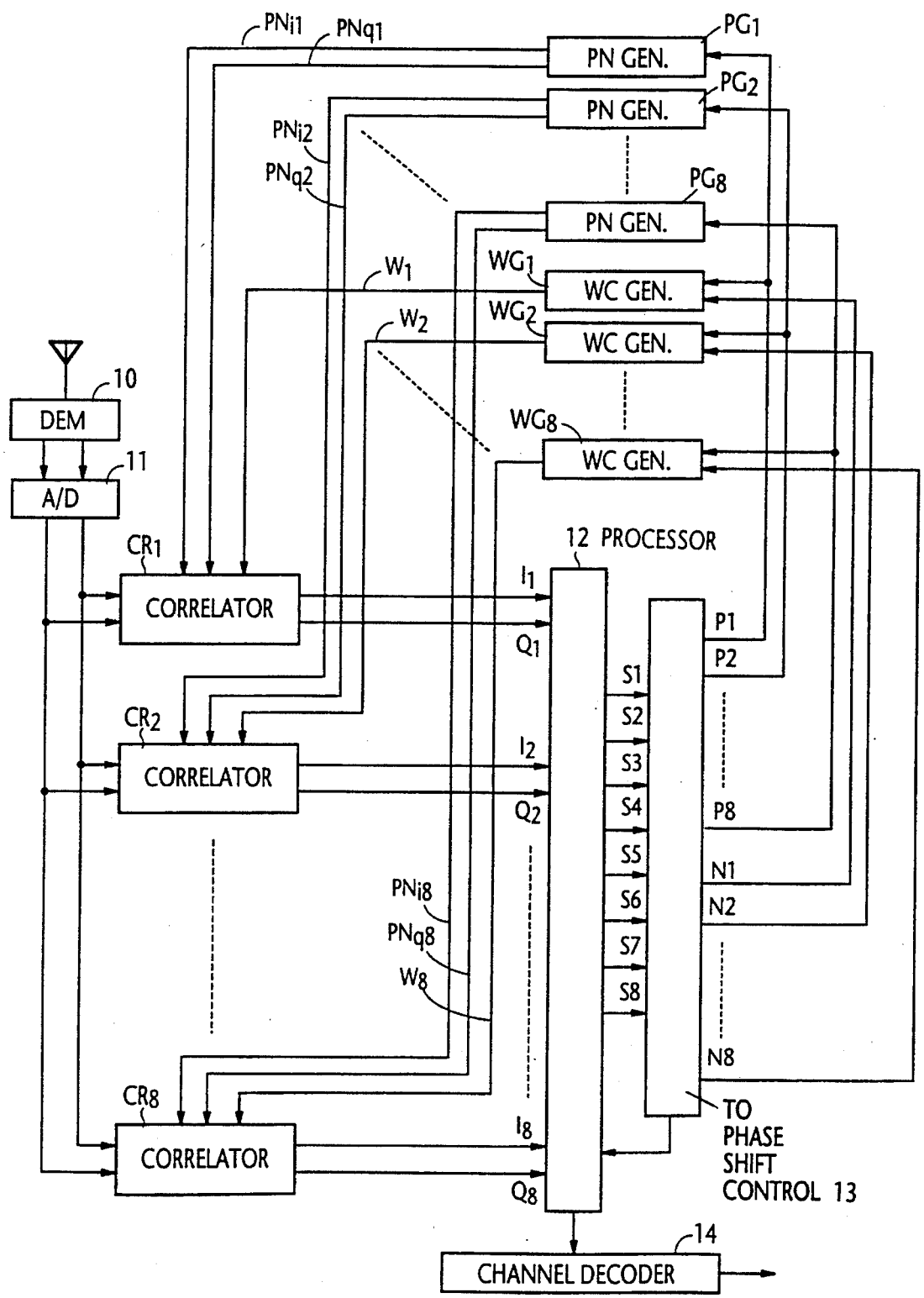
FIG. 1 is a block diagram of a direct sequence spread spectrum receiver according to the present invention.

Referring now to FIG. 1, there is shown a receiving circuit of a mobile station for a DS/CDMA cellular communications system according to the present invention. At a cell-site station, a baseband downlink (cell-to-mobile) signal is initially encoded by a channel encoder into a known coded form that is optimized for radio transmission. At the chip rate much higher than the symbol rate, the symbols of the encoded signal are spread with PN (pseudo-random number) spreading sequences $PN_i$ and $PN_q$ commonly assigned to the service area in which the mobile station is currently located and further spread with orthogonal Walsh codes uniquely assigned to the downlink channel. A pilot signal, which may be a series of all zeros or ones, is spread at the same chip rate with the same PN sequences $PN_i$ and $PN_q$ with orthogonal Walsh all-zero codes. The in-phase and quadrature components of spread spectrum downlink signal are combined with the corresponding components of spread spectrum pilot signal to produce an I signal and a Q signal which are modulated onto orthogonal radio-frequency carriers, amplified and transmitted.

The spread spectrum signal from the cell-site is received by the mobile station and supplied to a quadrature demodulator 10 which includes radio-frequency amplification and demodulation stages. Using orthogonal local carriers, the demodulator 10 recovers the original i and q signals. After analog-to-digital conversion by an A/D converter 11, the digital i and q signals are fed in parallel to correlators $CR_1$ to $CR_8$ of identical configuration.

Figure 2:
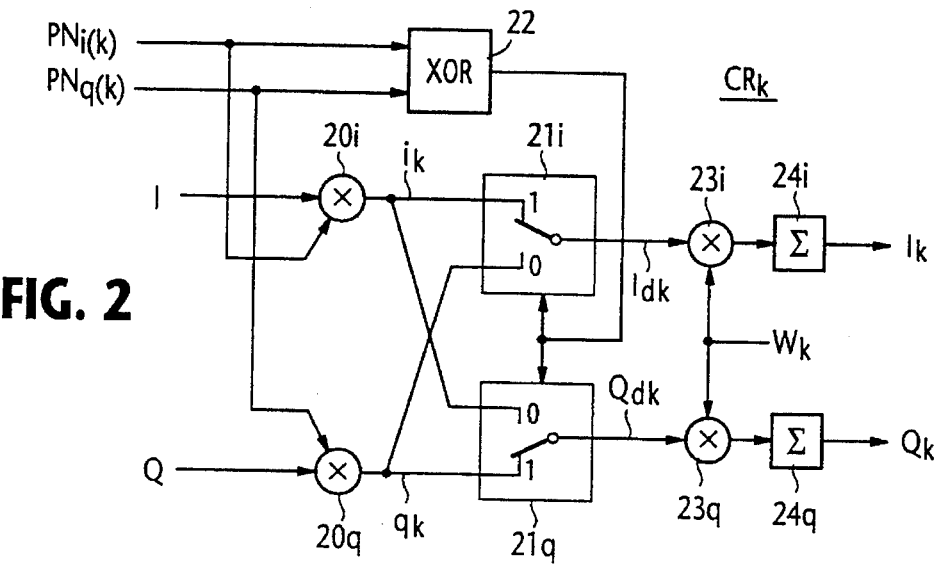
FIG. 2 is a circuit diagram of each correlator of FIG. 1.

As illustrated in FIG. 2, each of the correlators $CR_k$ (where k=1, 2, ... ,8) comprises a pair of multipliers 20$i$ and 20$q$ for multiplying the I and Q digital signals from A/D converter 11 with the pseudo-random despreading sequences $PN_{i(k)}$ and $PN_{q(k)}$ to produce an in-phase output $i_k = I \times PN_{ik}$ from multiplier 20$i$ and a quadrature output signal $q_k = Q \times PN_{qk}$ from multiplier 20$q$. The PN sequences $PN_{ik}$ and $PN_{qk}$ are the two inputs to an exclusive-OR gate 30 producing a switching signal. The output signal $i_k$ of multiplier 20$i$ and the output signal $q_k$ of multiplier 20$q$ are the inputs to switches 21$i$ and 21$q$. If the switching signal is a binary 1, the output of multiplier 21$i$ appears at the output of switch 21$i$ as a signal $I_{dk}$. If the switching signal is a binary 0, the signal $I_{dk}$ is equal to the output of multiplier 21$q$. Similarly, the output of multiplier 20$q$ appears at the output of switch 21$q$ as a signal $Q_{dk}$ when the switching signal is 1. Otherwise, the output of multiplier 20$i$ appears as $Q_{dk}$. Correlator $CR_k$ further includes a pair of multipliers 23$i$ and 23$q$ for despreading the signals $I_{dk}$ and $Q_{dk}$ with a Walsh code $W_k$. As will be described, all the Walsh codes supplied to correlators $CR_1$ to $CR_8$ are all-zero Walsh codes when the receiver is in a sync acquisition mode and some of these codes change to distinct Walsh codes of different Walsh code numbers when it is in a tracking mode. Since the pilot signal was spread at the transmitter with the all-zero Walsh code, the outputs of multipliers 23$i$ and 23$q$ represent the in-phase and quadrature components of the despread pilot signal during the sync acquisition mode and represent the in-phase and quadrature components of the despread data signal during the tracking mode. The outputs of multipliers 23$i$, 23$q$ are respectively integrated over a symbol interval to produce in-phase and quadrature pilot or data symbols $I_k$, $Q_k$.

Returning to FIG. 1, the orthogonal output signals from each of the correlators CR are supplied to a data processor 12 where they are processed in a manner to be described and applied to a phase shift controller 13 as correlation sum signals S1~S8. During the sync acquisition mode, pilot symbols are demodulated from the outputs of all correlators and applied to the phase shift controller. During the tracking mode, data symbols are demodulated from the outputs of correlators $CR_1$ to $CR_6$ and a sum of these signals is supplied to a channel decoder 14, while pilot signals are demodulated from the outputs of correlators $CR_7$ and $CR_8$ and applied to the phase shift controller as signals S7 and S8 and binary 0's are fed to the phase shift controller as signals S1 to S6. The CDMA receiver enters an update mode in which the phase timing obtained during the tracking mode is used to update the phase timing of the PN sequences applied the correlators $CR_7$ and $CR_8$ which were used during the tracking mode to produce pilot symbols. In this update mode, the outputs of all correlators are used to recover data symbols which are summed together and applied to the channel decoder 14.

In response to signals S1~S8, the phase shift controller 13 produces phase position signals P1~P8 and Walsh code numbers N1~N8. During the sync acquisition mode, the phase shift controller produces eight sequences of different phase position signals and supplies these sequences simultaneously as sequences P1~P8 to PN sequence generators $PG_1$~$PG_8$ and Walsh code generators $WG_1$~$WG_8$, respectively, and supplies zero Walsh code numbers ($\omega_0$) to all the Walsh code generators. During this acquisition mode, the phase shift controller makes a search through the correlation sum signals S1 to S8 generated as a result of successive phase shifts through all the range of the PN sequence (corresponding to the shifts of 0 to $2^{16}$ bits) and determines the highest three values and identifies corresponding phase positions $\Delta\theta_1$ to $\Delta\theta_3$.

During the tracking mode, these phase position signals are applied as signals P1 to P6 to PN generators $PG_1$ to $PG_6$ in pairs so that the PN generators of each pair are driven by the same phase position. PN generators $PG_7$ and $PG_8$ are then sequentially driven by signals P7 and P8 at phase positions which are located in the neighborhood of $\Delta\theta_1$ to $\Delta\theta_3$ to continue the search to precisely determine the optimum phase positions from the signals P7 and P8. At the same time, Walsh code numbers $\omega_1$, $\omega_3$ and $\omega_5$ are respectively supplied to Walsh code generators $WG_1$, $WG_3$ and $WG_5$ corresponding to phase positions $\Delta\theta_1$, $\Delta\theta_2$ and $\Delta\theta_3$, respectively, and zero code numbers $\Delta\theta_0$ are supplied to Walsh code generators $WG_2$, $WG_4$, and $WG_6$ to $WG_8$. As a result, during the tracking mode, the outputs of correlators $CR_k$ (where k=1, 3 and 4) are orthogonal data symbols, while the outputs of correlators $CR_{k+1}$ are orthogonal pilot symbols.

During the update mode, the phase position signals $\Delta\theta_1$ to $\Delta\theta_3$ are respectively updated with the optimum phase positions represented by signals P7 and P8.

By using the phase position signals P1~P8, PN generators $PG_1$~$PG_8$ respectively produce pairs of PN sequences $PN_{i1}$, $PN_{q1}$, $PN_{i2}$, $PN_{q2}$, ..., $PN_{i8}$, $PN_{q8}$ for coupling to correlators $CR_1$~$CR_8$, respectively. Each Walsh code generator $WG_k$ uses a phase position signal P(k) and a corresponding code number N(k) to produce a Walsh code at the phase timing of the signal P(k) for coupling to the corresponding correlator $CR_k$.

Figure 3A:
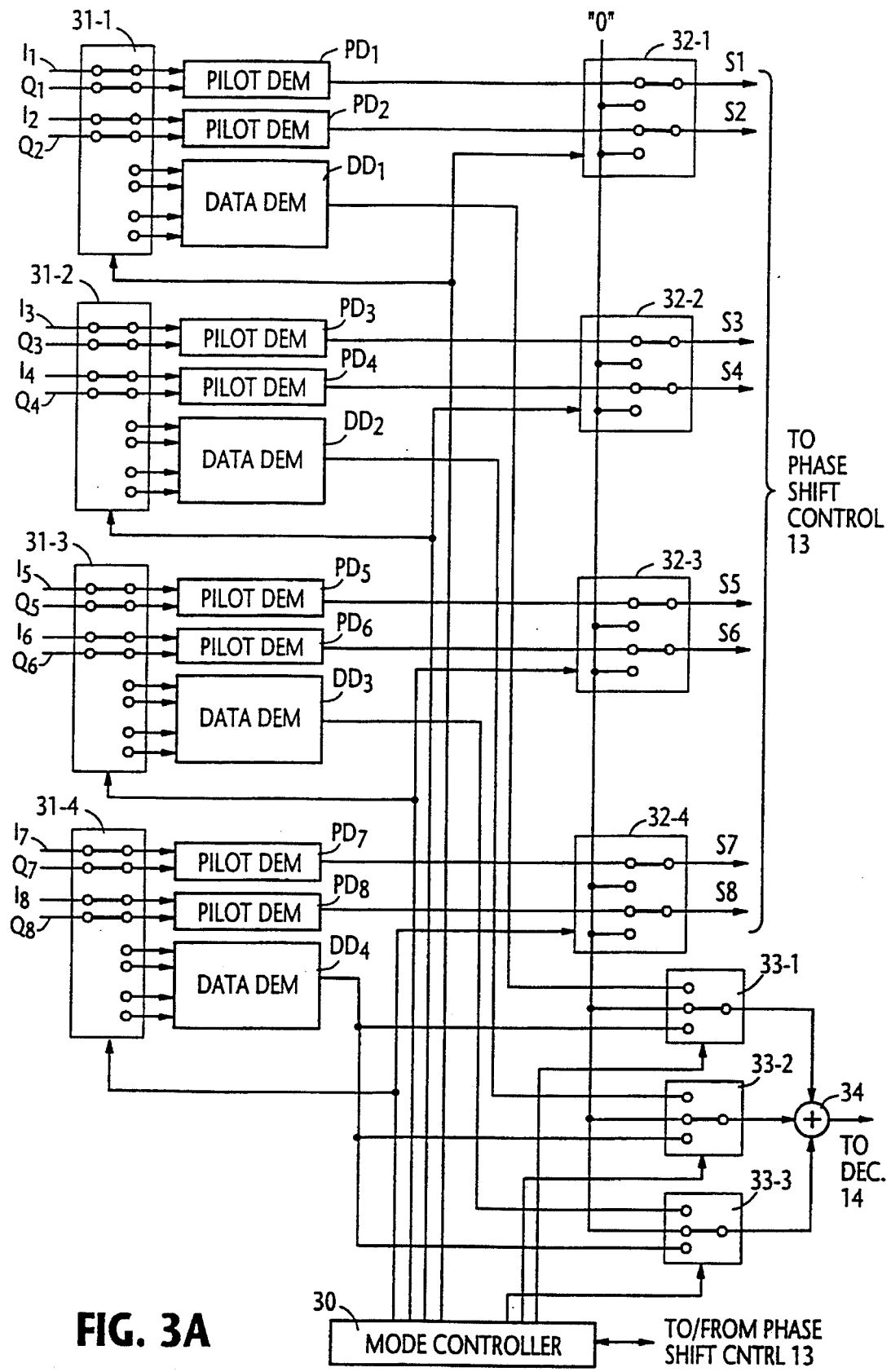
FIGS. 3A, 3B and 3C are block diagrams of the processor FIG. 1 during sync acquisition, tracking and update modes, respectively.
Figure 3B:
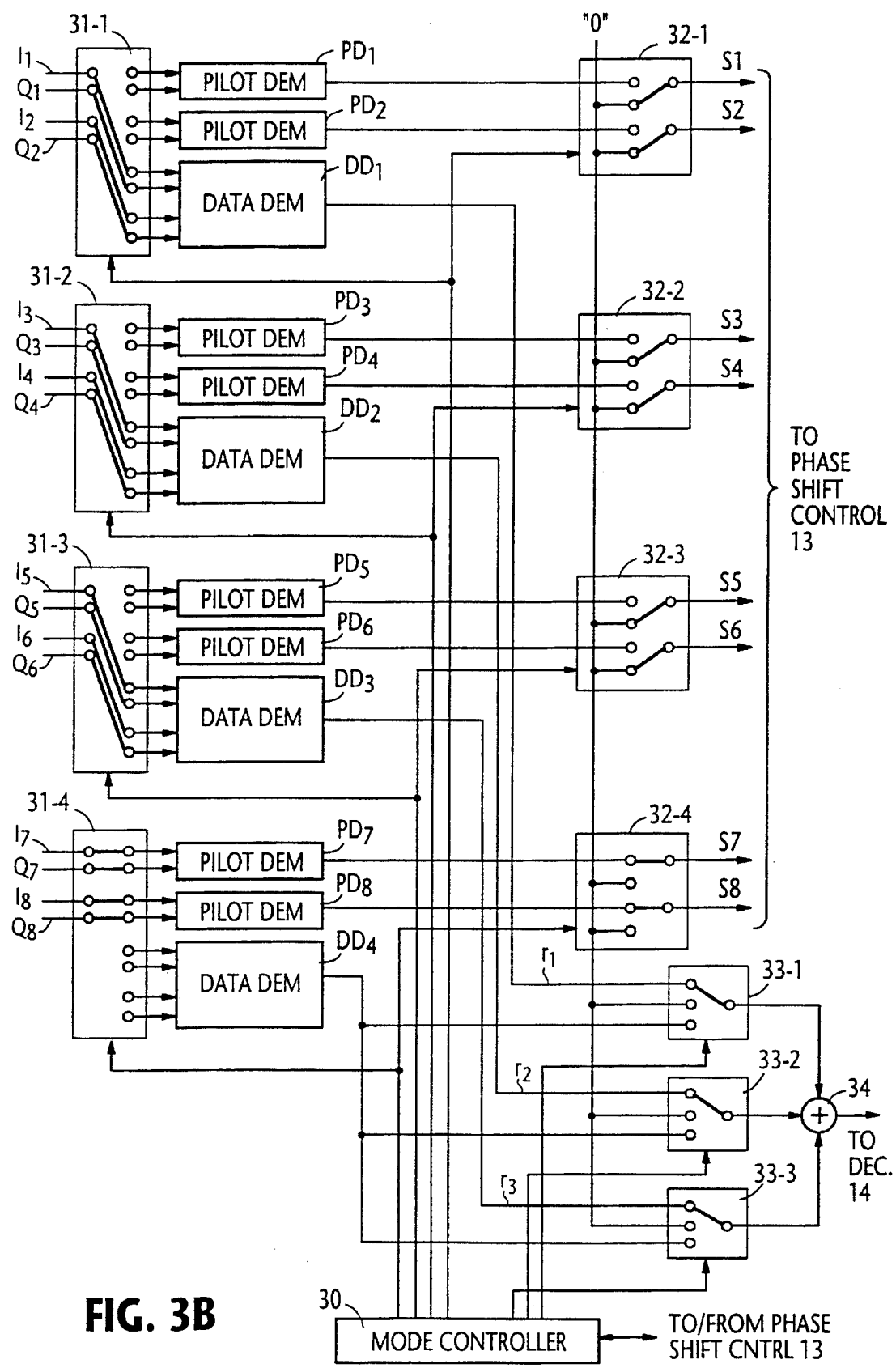
Figure 3C:
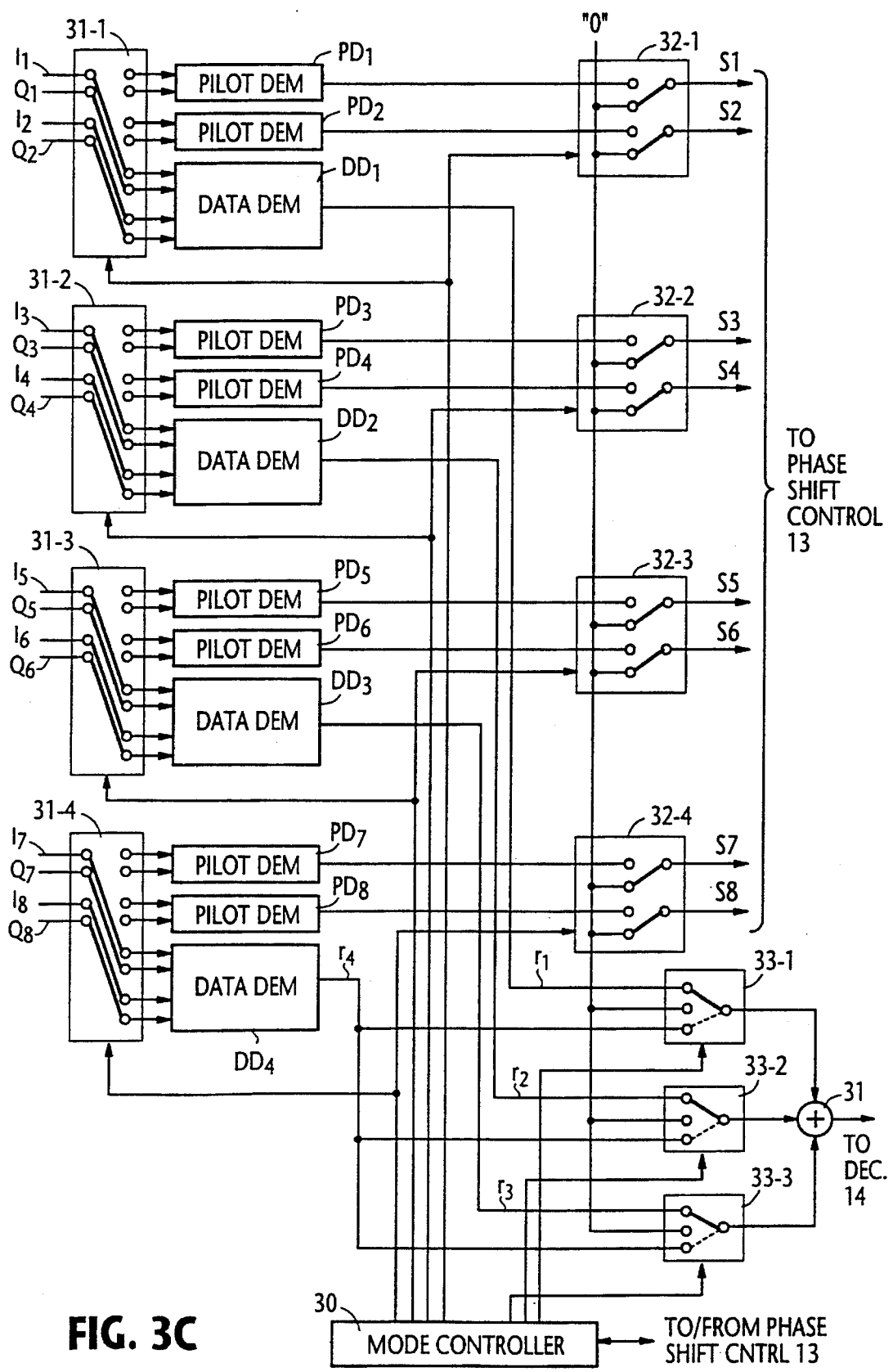

Details of the data processor 12 are shown in FIGS. 3A, 3B and 3C for sync acquisition, tracking and update modes, respectively. As illustrated in FIG. 3A, the processor 12 includes three groups of switches 31-i, 32-i and 33-j (where i=1~4, j=1~3). All of these switches operate in response to a switching signal supplied from a mode controller 22. The outputs of correlators $CR_1$ to $CR_8$ are coupled in pairs via corresponding switches 31-1, 31-2, 31-3 and 31-4 to pairs of pilot demodulators ($PD_1$, $PD_2$), ($PD_3$, $PD_4$),($PD_5$, $PD_6$) and ($PD_7$, $PD_8$) or data demodulators $DD_1$, $DD_2$, $DD_3$ and $DD_4$. The outputs of pilot demodulators of each pair are supplied via switch 32 corresponding to that pair to phase shift controller 13 as correlation sum signals S1 and S2 and the output of the data demodulator associated with that pair is supplied via corresponding switch 33 to an adder 34 as a signal "$r_i$". Therefore, the outputs of correlators $CR_3$ and $CR_4$, for example, are coupled via switch 31-2 to pilot demodulators $PD_3$, $PD_4$ or data demodulator $DD_2$ and the outputs of these pilot demodulators are coupled via switch 32-2 to phase shift controller 13 as correlation sum signals S3 and S4 and the output of data demodulator $DD_2$ being coupled via switch 33-2 to adder 34 as a signal $r_2$.

Mode controller 30 supplies a mode indicating signal to phase shift controller 13 and responds to a signal from phase shift controller 13 by operating the switches to change the operating mode to the next.

During the sync acquisition mode, mode controller 30 set all the switches so that the orthogonal output signals $I_k$ and $Q_k$ (where k=1, 2, ..., 8) are coupled to corresponding pilot demodulator $PD_k$ to supply correlation sum signals S1 to S8 to phase shift controller 13, and all the inputs to adder 34 are set to zero.

During the tracking mode (FIG. 3B), the outputs of correlators $CR_1$ to $CR_6$ are switched to the corresponding data demodulators $DD_1$~$DD_3$ producing output signals $r_1$, $r_2$, $r_3$, which are connected via switches 33-1, 33-2, 33-3 to the adder 34. Switches 32-1, 32-2 and 32-3 are switched to the binary 0 position to set the output level of signals S1 to S6 to zero. On the other hand, the outputs of correlators $CR_7$ and $CR_8$ remain connected to pilot demodulators $PD_7$ and $PD_8$ to produce correlation sum signals S7 and S8.

During the update mode (FIG. 3C), the outputs of all the correlators are connected in pairs to the corresponding data demodulators to generate output signals $r_1$-$r_4$. As will be described, switches 33-1, 33-2 and 33-3 are controlled to combine two of the signals $r_1$, $r_2$ and $r_3$ with the signal $r_4$ by adder 34 for a brief period immediately following a "ramp-up" time.

Figure 4:
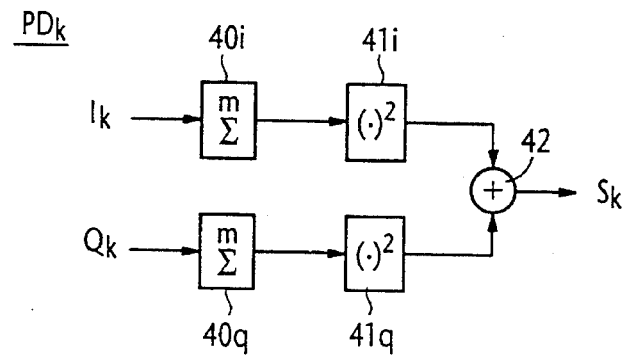
FIG. 4 is a circuit diagram of each pilot demodulator of FIGS. 3A, 3B and 3C.

As shown in FIG. 4, each pilot demodulator includes a pair of integrators 40i and 40q, a pair of squaring circuits 41i and 41q and an adder 42. The in-phase and quadrature signals $I_k$ and $Q_k$ from correlator $CR_k$ are respectively summed by integrators 40i, 40q during the period of "m" symbols to produce orthogonal sum signals which are squared respectively by the squaring circuits 41i and 41q. The sum-and-squared signals are combined together by adder 42 to produce the correlation sum signal $S_k$ for the correlator $CR_k$.

Figure 5A:
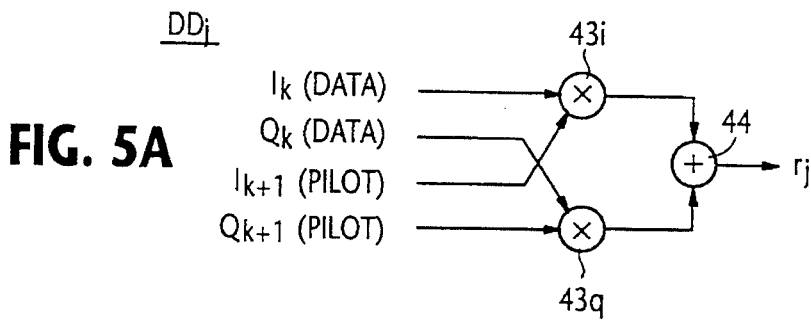
FIGS. 5A and 5B are circuit diagrams of different embodiments of each data demodulator of FIGS. 3A, 3B and 3C.

Details of each data demodulator $DD_j$ according to one embodiment of this invention are illustrated in FIG. 5A (where j=1, 2, ... 4). Each data demodulator $DD_j$ includes a pair of multipliers 43i and 43q and an adder 44. Multiplier 43i takes correlation between the output signal $I_k$ of correlator $CR_k$ and the output signal $I_{k+1}$ of correlator $CR_{k+1}$ and multiplier 43q takes correlation between the output signals $Q_k$ and $Q_{k+1}$. As described above, during the tracking mode, output signals $I_k$ and $Q_k$ are orthogonal data symbols, while output signals $I_{k+1}$ and $Q_{k+1}$ are orthogonal pilot symbols. Therefore, the multiplication of a data symbol of each in-phase or quadrature component with a pilot symbol of the corresponding orthogonal component at multiplier 43 causes the data symbol to be rotated to the reference axis of the I-Q plane and weighted by the amplitude of the pilot symbol. The outputs of multipliers 43i and 43q are summed together by adder 44 to produce an output signal $r_j$. The output of adder 44 is supplied to the channel decoder 14 where it undergoes a process inverse to that of the transmitter's channel encoder.

The amplitude of the pilot signal is usually much higher than that of the data signal, and the phase difference between these signals is negligibly small. In order to obtain the output signal $r_j$, the data signal vector is projected onto the I axis of the I-Q complex plane by multiplying each data signal component with a complex conjugate of the corresponding pilot signal component and summing the products as follows:

$$\begin{aligned} r_j &= Re\ [r_d \cos\theta_d\ (r_p \cos\theta_p - J\ r_p \sin\theta_p) + \\ & \quad r_d \sin\theta_d\ (r_p \sin\theta_p + J\ r_p \cos\theta_p)] \\ &= Re\ [r_p\ r_d\ (\cos\theta_p \cos\theta_d + \sin\theta_p \sin\theta_d) + \\ & \quad J\ r_p\ r_d\ (\cos\theta_p \sin\theta_d - \sin\theta_p \cos\theta_d)] \\ &= r_p\ r_d\ (\cos\theta_p \cos\theta_d + \sin\theta_p \sin\theta_d) \\ &= r_p\ r_d \cos(\theta_p - \theta_d) \end{aligned}$$

where $r_d$ is the amplitude of the data symbol, $r_p$ is the amplitude of the pilot symbol, $\theta_d$ and $\theta_p$ are the angle of phase of the data and pilot symbols, respectively. Equation (1) indicates that a unit vector of the data signal is rotated clockwise to the I axis of the I-Q complex plane and weighted by the scalar product $r_p\ r_d$.

Rotation of the data vector onto the I-axis of the I-Q complex plane allows for the simple summation of signals at the inputs of the adder 34 of processor 12. The use of the pilot vector in the rotation method described above reduces the effect of fading on the signal outputted from adder 24 as the pilot vector weights the data symbol and stronger multipath signals will have stronger moving-averaged pilot strong signals which indicate low levels of fading.

Figure 5B:
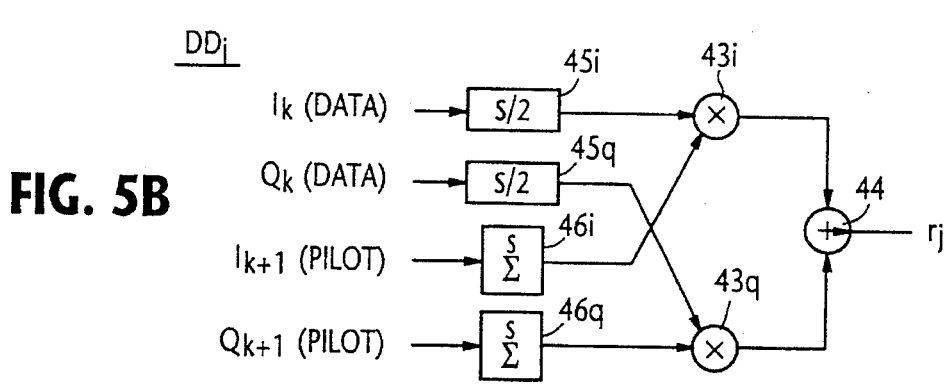

Another, but preferred embodiment of each data demodulator is shown in FIG. 5B in which each data demodulator further includes a pair of delay circuits 45i, 45q for introducing a delay of one half of "s" data symbols to the output signals $I_k$ and $Q_k$, respectively, and a pair of moving average circuits 46i, 46q for successively integrating "s" symbols of the output signals $I_{k+1}$ and $Q_{k+1}$, respectively, to produce a moving average value of pilot signals. Each of the moving average circuits is implemented with an s-stage shift register and an adder. The shift register receives an input signal from the preceding circuit and the adder is connected to all the stages of the register for successively summing the values of their contents so that the adder produces a signal representing the moving average of the values of "s" pilot symbols (corresponding to "s" data symbols) for each phase component. Thus, for each delayed data symbol, a moving average value is derived from s/2 pilot symbols that precede the delayed symbol as well as from s/2 pilot symbols that succeed it. If several data symbols are severely corrupted by noise during transmission, the corresponding pilot symbols are moving-averaged and the effect of the noise on the pilot signal is reduced in this manner, leading to a reduction in the effect of the noise on the signal $r_j$.

The outputs of delay circuit $45i$ and $45q$ are supplied respectively to the multipliers $43i$ and $43q$ and the moving average values of in-phase and quadrature components are supplied respectively to multipliers $43i$ and $43q$. Since the incoming data symbols are always subjected to multipath fading and Rayleigh fading, an incoming symbol may be corrupted by random noise during the time the corresponding pilot symbol is moving-averaged over the period of "s" symbols. The introduction of s/2-symbol delays has the effect of reducing noise-related problems to a minimum.

Figure 6A:
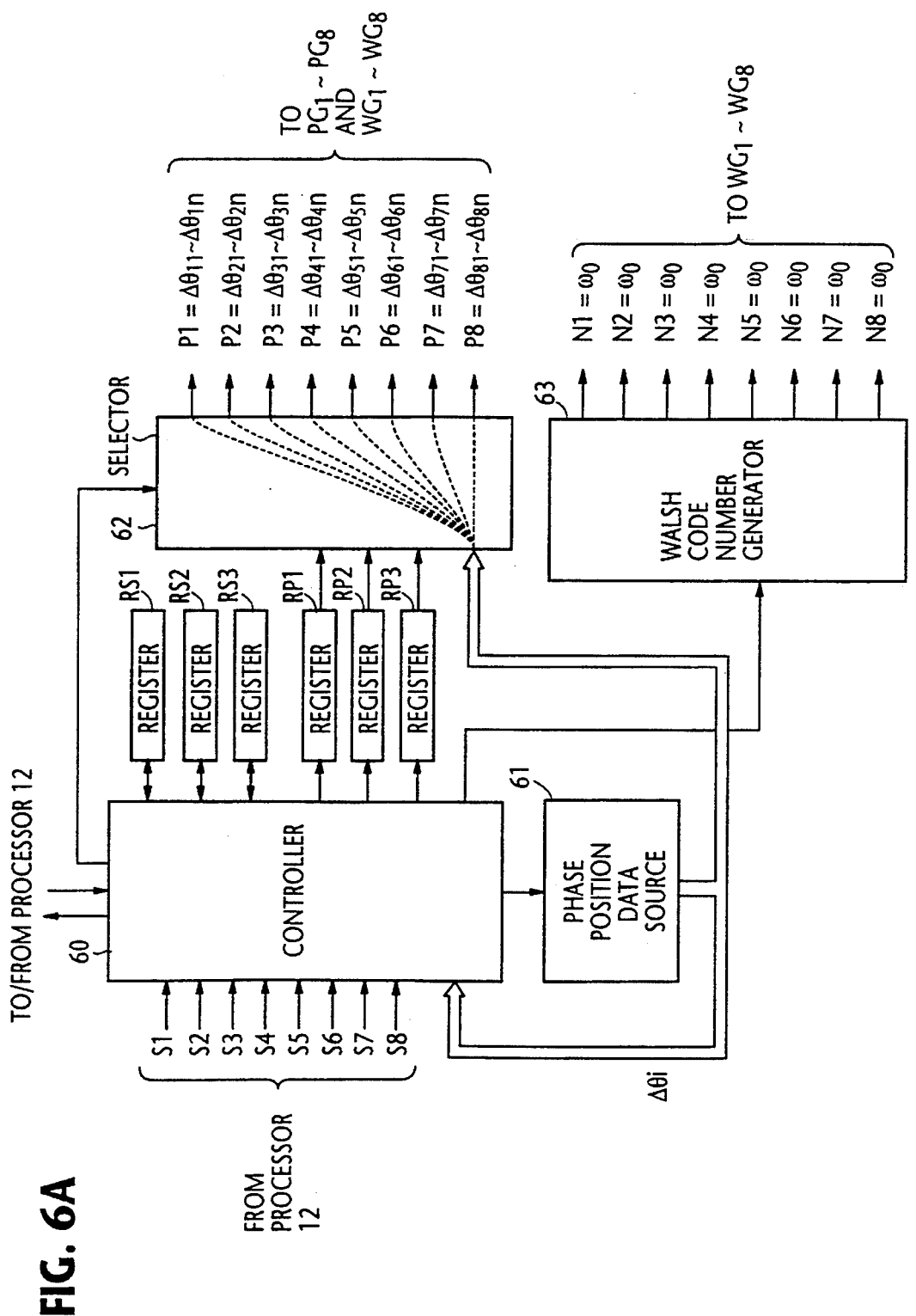
FIGS. 6A, 6B and 6C are block diagrams of the phase shift controller FIG. 1 during sync acquisition, tracking and update modes, respectively.
Figure 6B:
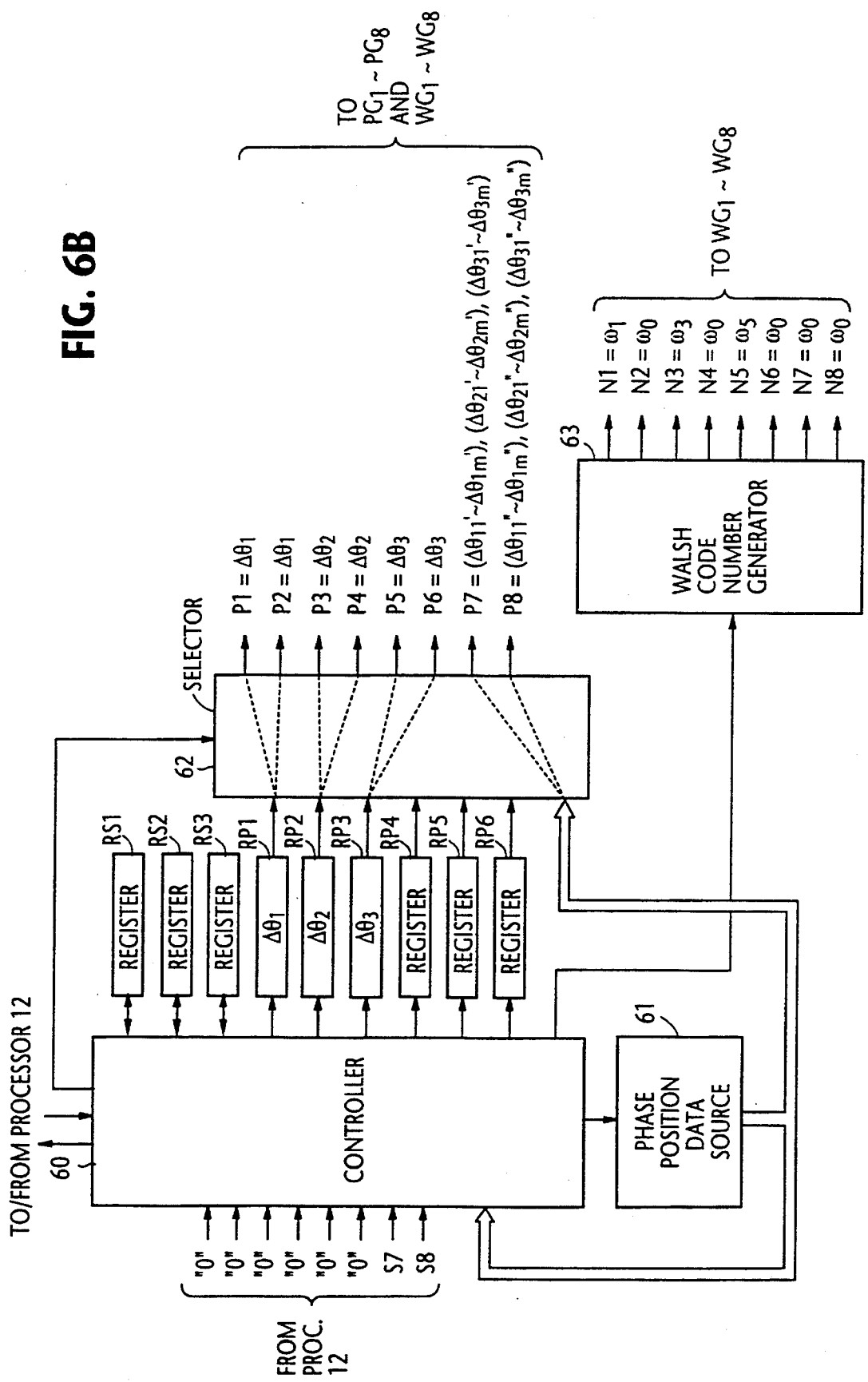
Figure 6C:
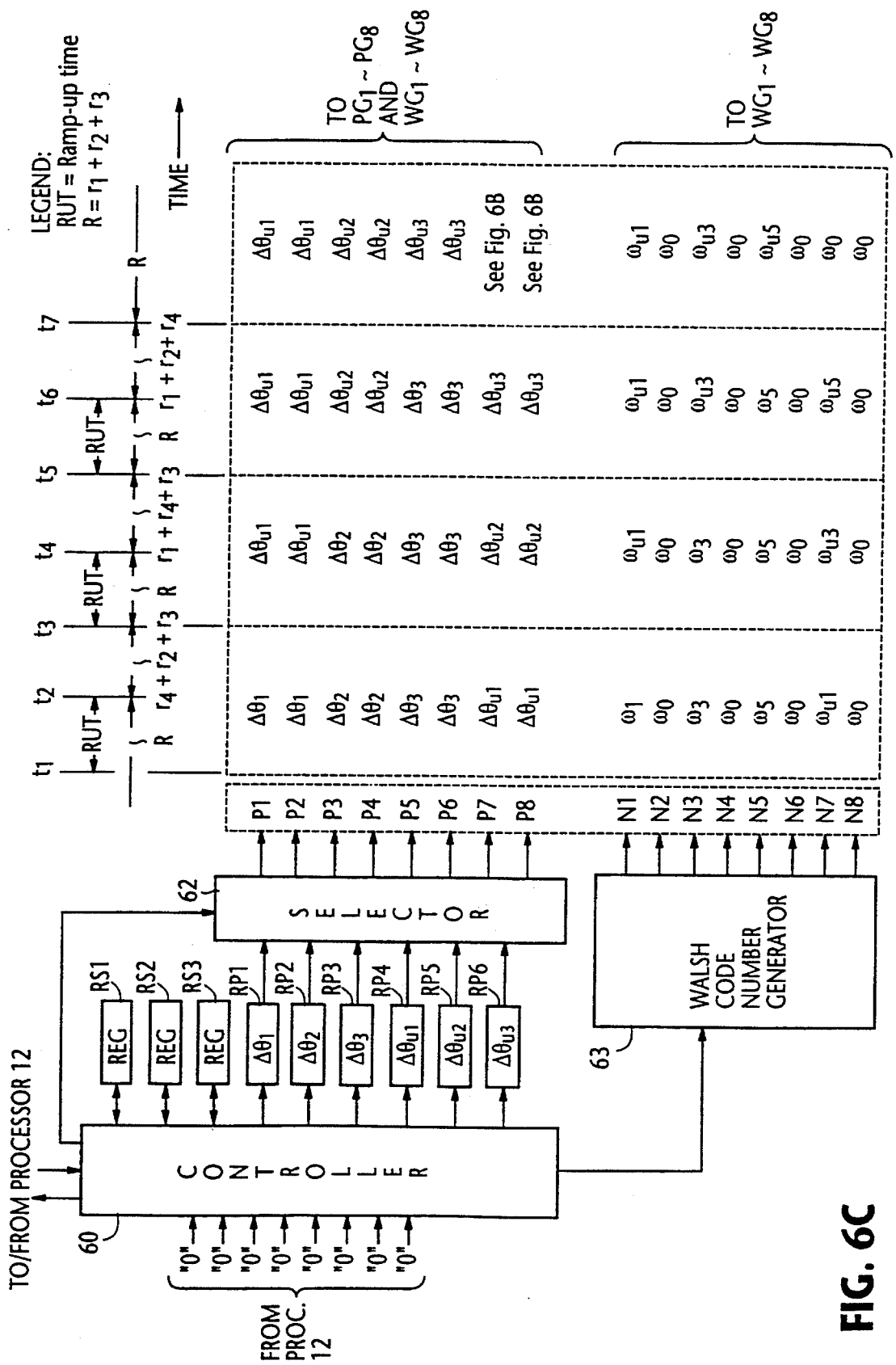

Referring to FIGS. 6A to 6C, details of the phase shift controller 13 are illustrated for the sync acquisition, tracking and update modes of operation, respectively. The phase shift controller comprises a controller 60, a phase position data source 61, a selector 62 and a Walsh code number generator 63.

In FIG. 6A, controller 60 is responsive to a mode indicating signal from processor 12. During a sync acquisition mode, controller 60 commands the phase position data source 61 to simultaneously generate phase position sequences Pk (where k=1, 2, . . . . , 8) each comprising position signals $\Delta\theta_{k1}$ to $\Delta\theta_{kn}$. The phase position signals P1~P8 are applied through selector 62 to the PN generators $PG_1$~$PG_8$ and Walsh code generators $WG_1$~$WG_8$, respectively. At the same time, controller 60 commands the Walsh code number generator 63 to generate zero Walsh code numbers $\omega_0$ and applies these numbers as signals N1~N8 to the Walsh code generators $WG_1$~$WG_8$, respectively.

In response to a sequence P(k) of phase position signals $\Delta\theta_{k1}$ to $\Delta\theta_{kn}$, each PN generator $PN_k$ (FIG. 1) successively supplies a sequence of in-phase pseudo-random numbers $PN_{i(k)}$ and a sequence of quadrature pseudo-random numbers $PN_{q(k)}$ to the corresponding correlator $CR_k$. At the same time, the correlator $CR_k$ is supplied with a Walsh code sequence $W_k$ that is produced by the Walsh code generator $WG_k$ according to the corresponding Walsh code number N(k) at successive phase positions $\Delta\theta_{k1}$ to $\Delta\theta_{kn}$.

All the correlators CR operate in parallel to take correlations between the incoming signal and the respective despreading codes (each comprising PN sequences and a Walsh sequence) during the sync acquisition mode, using divided sequences of phase position signals to all phase shift controller 13. Since the Walsh code sequences are all-zero sequences during the sync acquisition mode, mode controller 30 at data processor 12 initially sets all the switches A, B, C, D in a manner as illustrated in FIG. 3A, so that all pilot demodulators $PD_1$~$PD_8$ are connected to the outputs of corresponding correlators $CR_1$~$CR_8$ to produce correlation sum signals S1 through S8.

Returning to FIG. 6A, controller 60 is responsive to the signals S1~S8 for selecting the highest three values of correlation sums from all phase positions $\Delta\theta_{11}$ to $\Delta\theta_{8n}$ and the first, second and third highest values are stored into registers RS1, RS2 and RS3, respectively. Phase position signals $\Delta\theta_1$, $\Delta\theta_2$ and $\Delta\theta_3$ corresponding respectively to the first, second and third highest values are detected by controller 60 and stored into registers RP1, RP2 and RP3, respectively. Controller 60 returns an end-of-search signal signifying the end of a sync acquisition mode to the processor 12 to allow it to proceed to a tracking mode. As a result, the amount of time taken to complete a search through the whole range of phase positions is therefore ⅛ of the sync acquisition time which would be taken by a single correlator using a non-divided sequence of phase positions $\Delta\theta_{11}$ to $\Delta\theta_{8n}$.

In response to the end-of-search signal, the data processor 12 operates the switches 31, 32 and 33 as shown in FIG. 3B for coupling the inputs of data demodulators $DD_1$ to $DD_3$ to the outputs of corresponding correlators $CR_1$ to $CR_6$ and their outputs to adder 34 and disconnecting pilot demodulators $PD_1$ to $PD_3$ from their associated correlators CR to set the level of signals S1 to S6 to zero. The outputs of pilot demodulators $PD_7$ and $PD_8$ continue producing the signals S7 and S8. Mode controller 30 supplies a tracking mode signal to the controller 60 of phase shift controller 13.

In FIG. 6B, controller 60 responds to the tracking mode signal by controlling the selector 62 to read the phase position signals stored in registers RP1 to RP3 and delivered from the selector as signals P1 to P6. Specifically, the first phase position signal $\Delta\theta_1$ in register RP1 is coupled to PN generators PG1 and PG2 as signals P1 and P2, the second phase position signal $\Delta\theta_2$ in register RP2 being coupled to PN generators PG3 and PG4 as signals P3 and P4, and the phase position signal $\Delta\theta_3$ in register RP3 being coupled to PN generators PG5 and PG6 as signals P5 and P6. Concurrently, controller 60 selects phase positions ($\Delta\theta_{11}'$ to $\Delta\theta_{1m}'$) and ($\Delta\theta_{11}''$ to $\Delta\theta_{1m}''$) in the neighborhood of the phase position $\Delta\theta_1$, phase positions ($\Delta\theta_{21}'$ to $\Delta\theta_{2m}'$) and ($\Delta\theta_{21}''$ to $\Delta\theta_{2m}''$) in the neighborhood of the phase position $\Delta\theta_2$, and phase positions ($\Delta\theta_{31}'$ to $\Delta\theta_{3m}'$) and ($\Delta\theta_{31}''$ to $\Delta\theta_{3m}''$) in the neighborhood of the phase position $\Delta\theta_3$. Controller 60 directs the phase position data source 61 to simultaneously generate a first sequence of phase position signals ($\Delta\theta_{21}'$ to $\Delta\theta_{2m}'$), ($\Delta\theta_{21}'$ to $\Delta\theta_{2m}'$) and ($\Delta\theta_{31}'$ to $\Delta\theta_{3m}'$) and a second sequence of phase position signals ($\Delta\theta_{11}''$ to $\Delta\theta_{1m}''$), ($\Delta\theta_{21}''$ to $\Delta\theta_{2m}''$) and ($\Delta\theta_{31}''$ to $\Delta\theta_{3m}''$) and supply the first and second sequences as signals P6 and P7 to the PN generators PG7 and PG8, respectively.

Controller 60 commands the Walsh code number generator 63 to supply the following code numbers:

N1=$\omega_1$ (corresponding to $\Delta\theta_1$)

N2=$\omega_0$

N3=$\omega_3$ (corresponding to $\Delta\theta_2$)

N4=$\omega_0$

N5=$\omega_5$ (corresponding to $\Delta\theta_3$)

N6=$\omega_0$

N7=$\omega_0$

N8=$\omega_0$

As a result, correlators $CR_1$, $CR_3$, $CR_5$ produce orthogonal data signals $(I_1, Q_1)$, $(I_3, Q_3)$, $(I_5, Q_5)$, respectively, while correlators $CR_2$, $CR_4$, $CR_6$ produce orthogonal pilot signals $(I_2, Q_2)$, $(I_4, Q_4)$, $(I_6, Q_6)$, respectively. It is seen in FIG. 5A (or 5B), data signals $I_1$ and $Q_1$ are multiplied with pilot signal $I_2$ and $Q_2$ to produce an output signal $r_1$. Similarly, data signals $I_3$ and $Q_3$ are multiplied with pilot signal $I_4$ and $Q_4$, producing a signal $r_2$ and data signals $I_5$ and $Q_5$ are multiplied with pilot signal $I_6$ and $Q_6$, producing a signal $r_3$. The signals $r_1$, $r_2$ and $r_3$ are summed by adder 34 and fed to the channel decoder 14.

On the other hand, correlators $CR_7$ and $CR_8$ use the despreading sequences successively generated as a result of new phase positions to cause processor 12 to supply correlation sum signals S7 and S8 to controller 60 to allow it to search for the highest value of these correlation sums during this tracking mode. The first, second and third highest values are registers RS1, RS2 and RS3, respectively, and corresponding phase position signals $\Delta\theta_{u1}$, $\Delta\theta_{u2}$ and $\Delta\theta_{u3}$ are stored into register RP4, RP5 and RP6, respectively. Controller 60 then supplies a start-of-update signal to the processor 12.

In response to the start-of-update signal, the phase shift controller 13 enters an update mode. To ensure seamless transition of phase positions from those detected in the sync acquisition mode to those detected in the tracking mode (without over-correlation or under-correlation), mode controller 30 (FIG. 3C) introduces a "ramp-up" time at the instant the PN generators $PG_7$ and $PG_8$ are set to a new phase position according to each of the new phase position signals $\Delta\theta_{u1}$, $\Delta\theta_{u2}$ and $\Delta\theta_{u3}$.

More specifically, mode controller 30 receives the start-of-update signal and directs the switch 31-4 to couple the outputs of correlators $CR_7$ and $CR_8$ to data demodulator $DD_4$ and introduces a ramp-up time (RUT) in response to the data demodulator $DD_4$ being coupled to the correlators $CR_7$, $CR_8$. If the circuit of FIG. 5A is used for the data demodulators, the ramp-up time corresponds to one symbol interval and the transient period (i.e., $t_2$–$t_3$, $t_4$–$t_5$, $t_6$–$t_7$) in which the signal $r_4$ is connected to the adder also corresponds to one symbol interval. If use is made of the circuit of FIG. 5B both of the ramp-up time and the transient period correspond to the "s" symbol interval.

As shown in FIG. 6C, new phase position signals $\Delta\theta_{u1}$, $\Delta\theta_{u2}$ and $\Delta\theta_{u3}$ are respectively set into registers RP4, RP5 and RP6 and the selector 62 sets the phase position signals P7 and P8 to the new phase position $\Delta\theta_{u1}$ at time $t_1$ and Walsh code number generator 63 sets the code number N7 to $\omega_{u1}$ corresponding to $\Delta\theta_{u1}$.

In response to the start-of-update signal, mode controller 30 (FIG. 3C) introduces the ramp-up time corresponding to several symbols ("s" symbols in the case of FIG. 5B) which prevails until time $t_2$. The introduction of the ramp-up time allows previous residual data which may be left in correlators $CR_7$ and $CR_8$ and data demodulator $DD_4$ to be cleared and replaced with symbol or symbols resulting from the new phase position. Thus, the previous phase position $\Delta\theta_1$ is still used and adder 34 produces a signal $R=r_1+r_2+r_3$ during the time prior to time $t_2$.

During the interval $t_2$ to $t_3$, mode controller 30 (FIG. 3C) controls the switch 33-1 to connect the output signal $r_4$ of demodulator $DD_4$ to adder 34, instead of signal $r_1$, producing a signal $r_4+r_2+r_3$.

At time $t_3$, register RP1 (FIG. 6C) is updated with the new phase position signal $\Delta\theta_{u1}$ so that PN generators $PG_1$ and $PG_2$ are thereafter driven at the new phase position $\Delta\theta_{u1}$ and Walsh code number generator 63 updates the code number N1 with $\omega_{u1}$ replacing the previous number $\omega_1$ and sets the code number N7 to $\omega_{u3}$ corresponding to $\Delta\theta_{u2}$. Switch 33-1 (FIG. 3C) is returned to the uppermost position for coupling the output $r_1$ of demodulator $DD_1$ so that the output signal R of adder 34 during the interval $t_3$ to $t_4$ is equal to $R=r_1+r_2+r_3$ (see FIG. 6C).

Although the new phase position is used for the correlators $CR_1$ and $CR_2$, the signal $r_2$ resulting from the previous phase position $\Delta\theta_2$ is still used during the interval $t_3$ to $t_4$. Therefore, the interval $t_3$ to $t_4$ is the ramp-up time for correlators $CR_7$ and $CR_8$ and demodulator $DD_4$ to allow their residual signals resulting from the phase position $\Delta\theta_{u1}$ to be cleared. During the subsequent interval $t_4$ to $t_5$, switch 33-2 is moved to the lowermost position for coupling the signal $r_4$, instead of signal $r_2$, to adder 34, producing a signal $r_1+r_4+r_3$. At time $t_5$, register RP2 (FIG. 6C) is updated with the new phase position signal $\Delta\theta_{u2}$ so that PN generators $PG_3$ and $PG_4$ are thereafter driven at the new phase position $\Delta\theta_{u2}$. Concurrently, Walsh code number generator 63 updates the code number N3 by replacing $\omega_3$ with $\omega_{u3}$ corresponding to the new phase position $\Delta\theta_{u2}$.

During the subsequent interval $t_5$ to $t_6$, a ramp-up time is introduced for correlators $CR_7$, $CR_8$ and demodulator $DD_4$ to allow their residual signals resulting from the phase position signal $\Delta\theta_{u2}$ to be cleared in preparation for the new phase position $\Delta\theta_{u3}$. During interval $t_6$ to $t_7$, switch 33-3 is moved to the lowermost position for coupling the signal $r_4$ to adder 34, instead of signal $r_3$, producing a signal $r_1+r_2+r_4$. At time $t_7$, register RP3 (FIG. 6C) is updated with the new phase position signal $\Delta\theta_{u3}$ so that PN generators $PG_5$ and $PG_6$ are thereafter driven at the new phase position $\Delta\theta_{u3}$. Concurrently, Walsh code number generator 63 updates the code number N5 by replacing $\omega_5$ with $\omega_{u5}$ corresponding to the new phase position $\Delta\theta_{u3}$.

At time $t_7$, controller 60 controller 60 (FIG. 6B) directs the phase position data source 61 to regenerate the previously mentioned first and second sequences of phase position signals corresponding to those in the neighborhood of phase positions $\Delta\theta_1$, $\Delta\theta_2$ and $\Delta\theta_3$ and apply these sequences as phase position signals P7 and P8 to PN generators $PG_7$ and $PG_8$ to resume the search for optimum phase positions and commands the Walsh code number generator 63 to set the code number N7 to $\omega_0$. At the same time, controller 60 supplies an end-of-update signal to processor 12. In response, mode controller 30 of the processor operates switch 33-3 to return to the uppermost position, producing a signal $r_1+r_2+r_3$. The receiver now resumes the tracking mode.

What is claimed is:

1. A direct sequence spread spectrum receiver comprising:

a plurality of correlators for despreading a spread data signal and a spread pilot signal;

a plurality of pilot demodulators;

a plurality of data demodulators;

an adder;

control means for connecting said pilot demodulators to be responsive to said correlators respectively during a sync acquisition mode, and connecting said data demodulators to be responsive to said correlators and connecting said adder to be responsive to the data demodulators during a tracking mode;

code generator means for simultaneously and successively supplying a plurality of despreading codes of different phase positions to said correlators, respectively, to thereby cause said correlators to despread one of said spread data and pilot signals; and phase shift means for successively shifting the phase position of each of said despreading codes and determining high correlation values from output signals of said pilot demodulators during said sync acquisition mode, and setting the phase positions of said despreading codes during said tracking mode according to said high correlation values.

2. A direct sequence spread spectrum receiver as claimed in claim 1, further comprising:

a second correlator for despreading said spread data signal and said spread pilot signal;

second code generator means for successively supplying a second despreading code of different phase position to said second correlator to thereby cause said second correlator to despread said spread pilot signals; and a second pilot demodulator for operating on an output signal of said second correlator during said tracking mode, said phase shift means successively shifting the phase position of said second despreading code in the neighborhood of the phase positions previously set in the sync acquisition mode and determining second high correlation values from output signals of the second pilot demodulator during said tracking mode, and updating the previously set phase positions according to the second high correlation values during an update mode.

3. A direct sequence spread spectrum receiver as claimed in claim 1, further comprising:

a second correlator for despreading said spread data signal and said spread pilot signal;

a second pilot demodulator;

a second data demodulator; and second code generator means for successively supplying a second despreading code of different phase position to said second correlator to thereby cause said second correlator to despread said spread pilot signals, said control means connecting said second pilot demodulator to be responsive to said second correlator during said tracking mode, connecting said second data demodulator to be responsive to said second correlator during an update mode, and introducing a ramp-up time in response to said second data demodulator being connected to said second correlator, disconnecting a successive one of the outputs of the first-mentioned data demodulators from said adder for a predetermined interval immediately following said ramp-up time, and connecting the output of the second data demodulator to said adder during said predetermined interval, said phase shift means successively shifting the phase position of said second despreading code in the neighborhood of the phase positions previously set in the sync acquisition mode and determining second high correlation values from output signals of said second pilot demodulator during said tracking mode, and updating the previously set phase positions according to the second high correlation values during said update mode.

4. A direct sequence spread spectrum receiver as claimed in claim 1, wherein each of said data signal and said pilot signal contains in-phase and quadrature components, wherein a first group of said correlators produces in-phase despread data signals and quadrature despread data signals and a second group of said correlators produces in-phase despread pilot signals and quadrature despread pilot signals during said tracking mode, and wherein each of said data demodulators comprises:

a first multiplier for multiplying the in-phase despread data signal from a first one of said first-group correlators with the in-phase despread pilot signal from a second one of said second-correlators;

a second multiplier for multiplying the quadrature despread data signal from said first one of said first-group correlators with the quadrature despread pilot signal from said second one of said second-group correlators; and an adder for combining output signals of said first and second multipliers.

5. A direct sequence spread spectrum receiver as claimed in claim 1, wherein each of said data signal and said pilot signal contains in-phase and quadrature components, wherein a first group of said correlators produces in-phase despread data signals and quadrature despread data signals and a second group of said correlators produces in-phase despread pilot signals and quadrature despread pilot signals during said tracking mode, and wherein each of said data demodulators comprises:

first moving average means for successively summing a predetermined number of symbols of the in-phase despread pilot signal from a first one of the second-group correlators to produce a first moving average value;

second moving average means for successively summing said predetermined number of symbols of the quadrature despread pilot signal from a second one of the second-group correlators to produce a second moving average value;

first multiplier means for multiplying the in-phase data signal from a first one of said first-group correlators with the first moving average values;

second multiplier means for multiplying the quadrature data signal from a second one of said first-group correlators with the second moving average value; and an adder for summing output signals of the first and second multiplier means.

6. A direct sequence spread spectrum receiver as claimed in claim 5, further comprising:

first delay means for introducing a delay to the in-phase data signal from said first one of said first-group correlators by an amount corresponding to one half of said predetermined number of symbols and applying the delayed signal to said first multiplier means; and second delay means for introducing a delay to the quadrature data signal from said second one of said first-group correlators by an amount corresponding to one half of said predetermined number of symbols and applying the delayed signal to said second multiplier means.

7. A direct sequence spread spectrum receiver as claimed in claim 1, wherein each of said data signal and said pilot signal contains in-phase and quadrature components, wherein all of said correlators produces in-phase despread data signals and quadrature despread data signals during said sync acquisition mode, and wherein each of said pilot demodulators comprises:

first integrator means for summing a predetermined number of symbols of the in-phase pilot signal from a corresponding one of said correlators to produce a first integrated signal;

second integrator means for summing a predetermined number of symbols of the quadrature pilot signal from said corresponding one of said correlators to produce a second integrated signal;

first squaring means for squaring the first integrated signal;

second squaring means for squaring the second integrated signal; and an adder for summing output signals of said first and second squaring means.

8. A direct sequence spread spectrum receiver as claimed in claim 1, wherein said phase shift means includes:

phase position generating means for generating a plurality of sequences of phase position signals during said sync acquisition mode;

a Walsh code number generator for generating a plurality of Walsh code numbers;

wherein said code generator means comprises:

a plurality of pseudo-random number (PN) generators for generating a plurality of PN sequences at instants respectively determined by said phase position sequences and supplying said PN sequences to said correlators, respectively; and a plurality of Walsh code generators for generating a plurality of Walsh codes determined respectively by said Walsh code numbers at instants respectively determined by said phase position sequences, and supplying the Walsh codes to said correlators, respectively, said phase shift means including control means for setting, during said sync acquisition mode, all of said Walsh code numbers to an all-zero Walsh code number so that all of said Walsh codes generated by said Walsh code generators are zero sequences causing said pilot signal to appear from said correlators, setting, during said tracking mode, a first group of said Walsh code numbers corresponding to said phase positions determined by the first-mentioned high correlation values and setting a second group of said Walsh code numbers to said all-zero Walsh code number, causing said data signal to appear from the first group of said correlators and said pilot signal to appear from the second group of said correlators, and updating, during said update mode, the Walsh code numbers of said first group according to the second high correlation values.

9. A direct sequence spread spectrum receiver comprising:

a plurality of first correlators for despreading a spread data signal and a spread pilot signal;

a second correlator for despreading said spread data signal and said spread pilot signal;

a plurality of first pilot demodulators;

a second pilot demodulator for operating on an output signal of said second correlator during a sync acquisition mode and during a tracking mode;

a plurality of data demodulators;

control means for causing said first pilot demodulators to operate on output signals of said first correlators respectively during said sync acquisition mode, causing said data demodulators to operate on the output signals of said first correlators during said tracking mode and combining output signals of the data demodulators;

first code generator means for simultaneously and successively supplying a plurality of first despreading codes of different phase positions to said first correlators respectively to thereby cause said first correlators to despread one of said spread data and pilot signals;

second code generator means for successively supplying a second despreading code of different phase positions to said second correlator to thereby cause said second correlator to despread said spread pilot signals; and phase shift means for successively shifting the phase position of each of said first despreading codes and determining first high correlation values from output signals of said first and second pilot demodulators during said sync acquisition mode, setting the phase positions of said first despreading codes during said tracking mode according to said first high correlation values, successively shifting the phase position of said second despreading code in the neighborhood of the phase positions previously set in the sync acquisition mode and determining second high correlation values from said second pilot demodulator during said tracking mode, and updating the previously set phase positions according to the second high correlation values during an update mode.

\* \* \* \* \*